United States Patent
Hasegawa et al.

(10) Patent No.: US 10,539,966 B2
(45) Date of Patent: Jan. 21, 2020

(54) SERVICE COOPERATION SYSTEM FOR VEHICLE

(71) Applicant: DENSO CORPORATION, Kariya, Aichi-pref. (JP)

(72) Inventors: Takuya Hasegawa, Kariya (JP); Kazuaki Hayakawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 162 days.

(21) Appl. No.: 15/711,038

(22) Filed: Sep. 21, 2017

(65) Prior Publication Data

US 2018/0088589 A1 Mar. 29, 2018

(30) Foreign Application Priority Data

Sep. 28, 2016 (JP) .................................. 2016-189616
Jul. 7, 2017 (JP) .................................. 2017-133653

(51) Int. Cl.
| | |
|---|---|
| G05D 1/02 | (2006.01) |
| G05D 1/00 | (2006.01) |
| G06Q 50/30 | (2012.01) |
| H04L 12/40 | (2006.01) |

(52) U.S. Cl.
CPC ......... *G05D 1/0276* (2013.01); *G05D 1/0088* (2013.01); *G06Q 50/30* (2013.01); *H04L 12/40* (2013.01); *B60W 2550/404* (2013.01); *G05D 2201/0213* (2013.01)

(58) Field of Classification Search
CPC ............... G05D 1/0276; G05D 1/0088; G05D 2201/0213; B60W 30/00; B60W 2550/404; H04L 12/40026; H04L 12/40; H04L 67/12; H04L 12/40169; H04L 2012/40273; G06Q 50/30; H04W 4/00
USPC .......................................................... 701/23
See application file for complete search history.

(56) References Cited

U.S. PATENT DOCUMENTS

2006/0111825 A1 5/2006 Okada et al.
2015/0271276 A1 9/2015 Edlund et al.

FOREIGN PATENT DOCUMENTS

| JP | 2006-142994 A | 6/2006 |
| JP | 2009-196555 A | 9/2009 |
| JP | 2014-153858 A | 8/2014 |
| JP | 2015-187859 A | 10/2015 |

*Primary Examiner* — Brian P Sweeney
(74) *Attorney, Agent, or Firm* — Harness, Dickey & Pierce, P.L.C.

(57) ABSTRACT

A service cooperation system enables a use of a function provided by an in-vehicle apparatus or an external apparatus as a service. The service cooperation system for the vehicle includes a service interface, a local service bus, a service bus, and an integrated application. The service interface of a subject apparatus provides the service generated in the subject apparatus to a different apparatus. The local service bus transmits and receives a message between the service interface of the subject apparatus and the service interface of the different apparatus. The service bus is virtually configured by a connection of the local service bus of the subject apparatus and the local service bus of the different apparatus. The integrated application functions as the application and enables a cooperated use of an in-vehicle service and an external service through the service bus.

11 Claims, 14 Drawing Sheets

FIG. 9

| INFORMATION | DETAIL OR SUPPLEMENTATION |
|---|---|
| SERVICE ID | NAME OF SERVICE |
| SERVICE VERSION | VERSION OF SERVICE |
| SERVICE PROTOCOL | COMMUNICATION PROTOCOL OF SERVICE |
| EMPLOYING SERVICE | ANOTHER SERVICE EMPLOYED BY SUBJECT SERVICE |
| ALTERNATIVE SERVICE | FOR SAFE TRAVELLING AND SAFE STOP |
| EXISTING OF INFLUENCE ON VEHICLE CONTROL | INFLUENCE ON STRAIGHT TRAVELLING, CURVED TRAVELLING, AND STOP |
| PRIORITY OF SERVICE TRANSMISSION AND RECEPTION | EMPLOYED IN PRIORITY CONTROL OF ARBITRATION AMONG MULTIPLE SERVICES |
| AUTHORITY OF CONNECTION | CONNECTION TO PRIORITY OF SERVICE TRANSMISSION AND RECEPTION |
| INSTALLATION POSITION OF SERVICE | CONSTRAINT TO ESTABLISH SERVICE |
| RELIABILITY | MANUFACTURER OF SERVICE |
| SERVICE OF ANOTHER VEHICLE | SERVICE INSTALLED TO ANOTHER VEHICLE WHICH IS ALLOWED TO BE CONNECTED WITH SUBJECT SERVICE |
| EXTERNAL SERVICE | SERVICE ALLOWED TO BE CONNECTED WITH SUBJECT SERVICE |
| PRICE | PRICE OF SERVICE |
| RECOMMENDATION | RECOMMENDATION LEVEL OF SERVICE |
| REQUIREMENT FOR DELAY | COMMUNICATION DELAY TIME NECESSARY FOR ESTABLISHING SUBJECT SERVICE |
| EXPIRATION TIME | INCLUDING EXISTENCE OF AUTOMATIC UPDATE |
| REMOVAL AND ADDITION UNIT | UNIT OF REMOVAL AND ADDITION |
| SECURITY LEVEL | SECURITY LEVEL OF SUBJECT SERVICE |
| SAFETY LEVEL | SAFETY LEVEL OF SUBJECT SERVICE |

SERVICE COOPERATION SYSTEM FOR VEHICLE

CROSS REFERENCE TO RELATED APPLICATION

This application is based on Japanese Patent Application No. 2016-189616 filed on Sep. 28, 2016 and Japanese Patent Application No. 2017-133653 filed on Jul. 7, 2017, the disclosures of which are incorporated herein by reference.

TECHNICAL FIELD

The present disclosure relates to a service cooperation system or a vehicle.

BACKGROUND

As described in JP 2014-153858 A, JP 2015-187859 A (corresponding to US 2015/0271276 A), and JP 2006-142994 A (corresponding to US 2006/0111825 A), a cooperated use of multiple functions provided by multiple electronic control units (ECUs) is proposed. In this case, the multiple ECUs mounted on a vehicle cooperate with each other. In a self-driving service, a self-driving ECU executes an autonomous control by comprehensively determining a result of detection of an in-vehicle sensor mounted on the vehicle. With this configuration, a high level drive support system in order to achieve the self-driving is being developed.

SUMMARY

Only an autonomous control executed by an in-vehicle sensor is difficult to control the vehicle smoothly in a dead area of an intersection, or under a bad weather which degrades recognition accuracy of road shape caused by snow or dust.

For dealing with the above-described difficulty of the autonomous control, an external service provided by an external apparatus including the information technology (IT) infrastructure and the transportation infrastructure preliminarily recognizes another car existing in the dead area. An attempt to complement the smooth autonomous control is executed by adapting this configuration. The external service complements a function of the in-vehicle apparatus.

Usually, the function of the in-vehicle apparatus is fixed once the vehicle is manufactured. In contrast, the external service provided by the external apparatus including the IT infrastructure and the transportation infrastructure develops rapidly. Thus, the function of the vehicle is degraded soon compared with the external service. This difficulty happens by a difference of life cycle between the external service and the function of the vehicle.

In view of the foregoing difficulties, it is an object of the present disclosure to provide a service cooperation system for a vehicle that is capable of improving the function of the vehicle by keeping pace with a rapid development of the external service provided by the external apparatus including the IT infrastructure and the transportation infrastructure.

According to an aspect of the present disclosure, a service cooperation system for a vehicle is provided. The service cooperation system enables a use of a function provided by an in-vehicle apparatus or an external apparatus as a service. The in-vehicle apparatus is connected to an in-vehicle network of the vehicle. The external apparatus is communicably connected to the service cooperation system in wireless manner. The service cooperation system for the vehicle includes a service interface, a local service bus, a service bus, and an integrated application. The service interface is provided to each of a subject apparatus and a different apparatus. The subject apparatus is one of the in-vehicle apparatus or the external apparatus. The different apparatus is a remaining one of the in-vehicle apparatus or the external apparatus. The service interface of the subject apparatus transmits a request for the service to the different apparatus in response to a request transmitted from an application of the different apparatus. The service interface of the subject apparatus generates the service in the subject apparatus in response to a request, which requests for the service of the subject apparatus and is transmitted from the different apparatus. The service interface of the subject apparatus provides the service generated in the subject apparatus to the different apparatus. The local service bus is provided to each of the subject apparatus and the different apparatus. The local service bus transmits and receives a message between the service interface of the subject apparatus and the service interface of the different apparatus under a predetermined protocol in response to a request or a response of the service. The service bus is virtually configured by a connection of the local service bus of the subject apparatus and the local service bus of the different apparatus. The integrated application functions as the application and enables a cooperated use of an in-vehicle service and an external service through the service bus. The in-vehicle service is provided by the in-vehicle apparatus, and the external service is provided by the external apparatus.

In the above service cooperation system for the vehicle, the virtual service bus is established between the in-vehicle apparatus and the external apparatus. With this configuration, the in-vehicle service provided by the in-vehicle apparatus and the external service provided by the external apparatus can be available for the integrated application by cooperating with each other. Thus, the function of the subject vehicle can keep pace with the development of the external service.

BRIEF DESCRIPTION OF THE DRAWINGS

The above and other objects, features and advantages of the present disclosure will become more apparent from the following detailed description made with reference to the accompanying drawings. In the drawings:

FIG. 9 is a diagram showing an outline of the service;

DETAILED DESCRIPTION

Hereinafter, a service cooperation system for a vehicle according to an embodiment of the disclosure will be described with reference to the drawings. The service cooperation system for the vehicle enables an in-vehicle service provided by an in-vehicle apparatus and an external service provided by an external apparatus to cooperate with each other and provides an improved response speed for cooperation. The service represents a provision of a function to another service or an application. Ordinarily, the service is configured by multiple functions.

Figure 2:
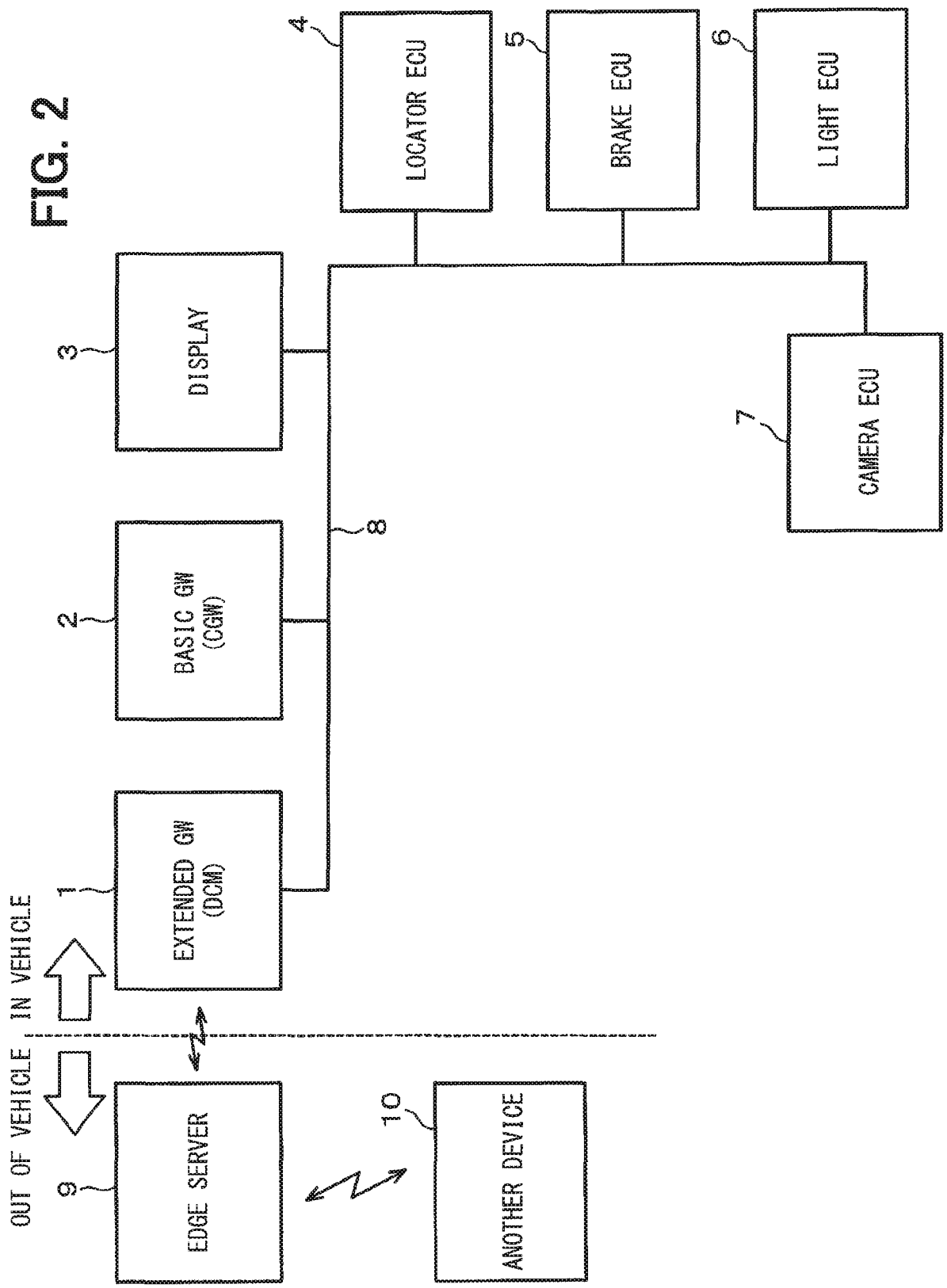
FIG. 2 is a block diagram showing the in-vehicle apparatus and the external apparatus.

As shown in FIG. 2, the in-vehicle apparatus includes an extended gateway 1, a basic gateway 2, a display device 3, a locator ECU 4, a brake ECU 5, a light ECU 6, and a camera ECU 7 which are connected with an in-vehicle network 8. In the present embodiment, the extended gateway 1 is provided by a data communication module (DCM), the basic gateway 2 is provided by a central gateway (CGW). Hereinafter, the extended gateway 1 is also referred to as the extended GW 1, and the basic gateway 2 is referred to as the basic GW 2. A protocol of the in-vehicle network 8 is properly defined for each domain. The domain may include one or more ECUs that communicate under the same communication protocol. The protocol may be one of Controller Area Network (CAN), Local Interconnect Network (UN), FlexRay, or Ethernet. Herein, CAN, FlexRay, and Ethernet are registered trademarks. FIG. 2 only shows representative ECUs, but almost one hundred ECUs are actually connected to the in-vehicle network 8.

Each of the GWs 1, 2, the display device 3, and each of the ECUs 4, 5, 6, 7 have respective control apparatuses that are publicly known. The control apparatus is not indicated in any figure. The control apparatus is configured by a microcomputer having a central processor unit (CPU), a random access memory (RAM), a read-only memory (ROM), and an input/output (I/O). With this configuration, the control apparatus executes a function program stored in a non-transitory tangible storage medium. Thus, the function program is provided as the service in addition to a normal process.

Figure 1:
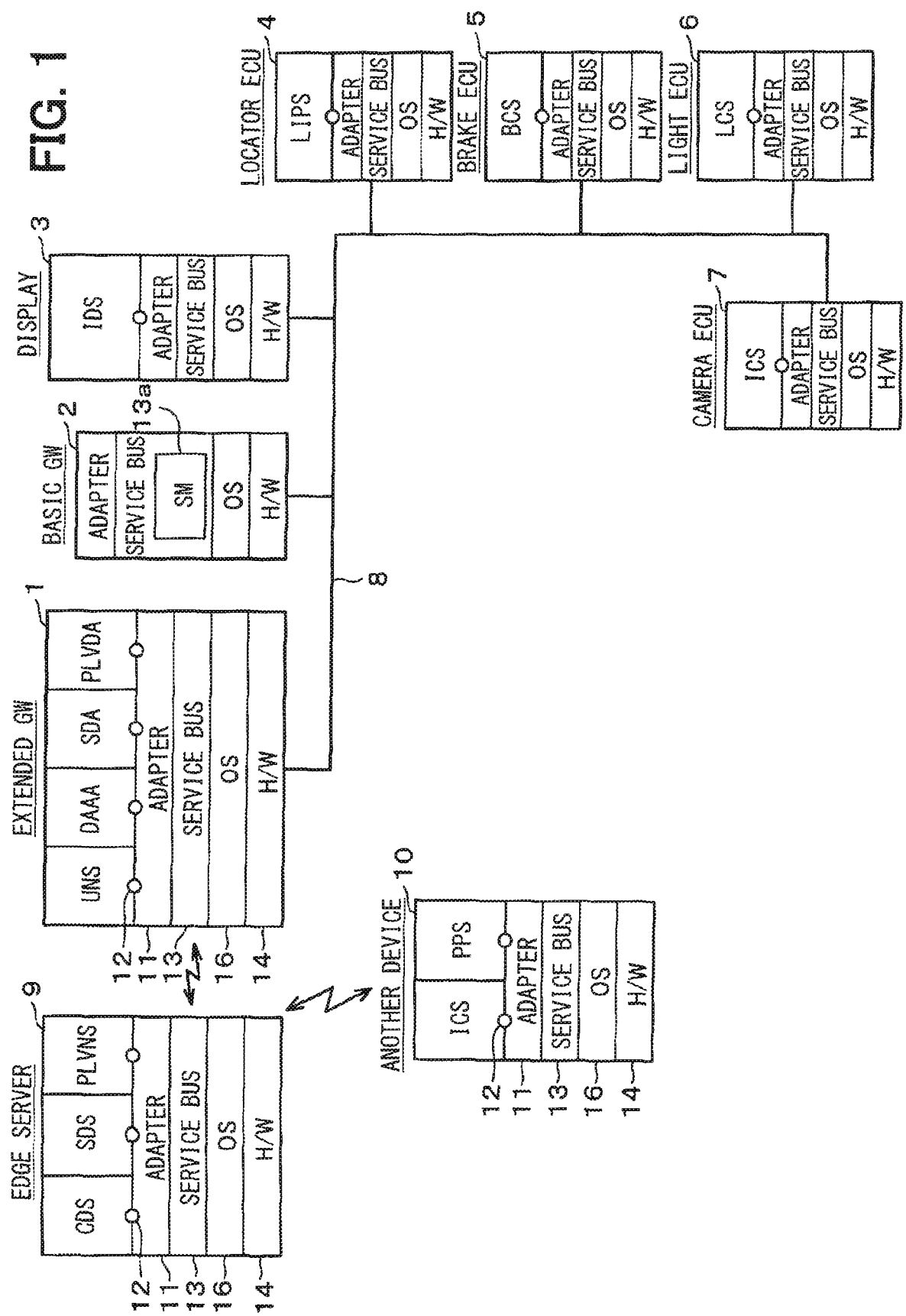
FIG. 1 is a diagram schematically showing a configuration of an in-vehicle apparatus and an external apparatus according to an embodiment.

As shown in FIG. 1, in-vehicle services and applications are installed to the extended GW 1, the basic GW 2, the display device 3, and each of the ECUs 4, 5, 6, 7. The extended GW 1 is configured to establish wireless communication with the external apparatus. The extended GW 1 is installed with an update notification service (UNS), a dead area avoidance application (DAAA), a stranger detection application (SDA), and a parking lot vacancy detection application (PLVDA). The update notification service notifies a user of an update of the external service. The external service represents a service provided by a system existing out of the vehicle. Herein, the system existing out of the vehicle may be a server or an in-house system. The server or the in-house system may provide traffic information, amusement information, and a mail service.

The basic GW 2 performs a rooting among domains to which the display device 3 and each of the ECUs 4, 5, 6, 7 belong. The domains may include an external service system domain, a human system domain, an environment system domain, a body system domain, and a movement system domain.

The display device 3 is installed with an image display service (IDS). Herein, the display device 3 displays various kinds of operation buttons for operating an air conditioner, an audio, or the like and a map for navigation.

The locator ECU 4 is installed with a location information provision service (LIPS). Herein, the locator ECU 4 measures, with high accuracy, a position of subject vehicle, which is necessary for autonomous control for self-driving. The locator ECU 4 provides the measured position of subject vehicle to a self-driving system so that the autonomous control is executable by the self-driving system.

The brake ECU 5 is installed with a brake control service (BCS). Herein, the brake ECU 5 executes a brake operation when operated by an occupant or automatically executes a brake control during the self-driving. The light ECU 6 is installed with a light control service (LCS). Herein, the light ECU 6 executes a turn-on/off operation when operated by the occupant or executes an automatic light turning on/off during a self-control of the light. The camera ECU 7 is installed with an image capturing service (ICS). Herein, the camera ECU 7 captures a preceding vehicle or an obstacle existing in front of the subject vehicle.

An edge server 9 is provided as the external apparatus. The edge server 9 is installed with a collision determination service (CDS), a stranger detection service (SDS), and a parking lot vacancy notification service (PLVNS). These services are properly installed to the edge server 9 corresponding to an edge area defined by a short range communication area of the edge server 9. The edge server 9 is a server disposed on a middle layer existing between a cloud server and a device. In this configuration, the edge server 9 provides a process in which more punctual real-time property is required than the cloud service, and provides specified information among the cloud information collected by the cloud server. The specified information represents sensing information that another device 10 collects.

Another device 10 may represent the in-vehicle apparatus mounted on another vehicle, a smartphone that a bicycle rider or a pedestrian has, or a monitor camera disposed in a parking lot or at an intersection. Another device 10 is installed with the image capturing service or a position provision service (PPS). These services are properly installed to another device 10 corresponding to a type of another device 10. For example, the in-vehicle apparatus and the smartphone may be installed with the position provision service, and the monitor camera may be installed the image capturing service. Another vehicle traveling around the subject vehicle provides the position information of another vehicle. The smartphone that the person riding a bicycle has provides the position information of the person. The monitor camera disposed at the intersection provides the position information of the pedestrian existing in the dead area of the intersection by the captured information. The monitor camera disposed at a house parking lot provides position information of a stranger existing around the house by the captured information. The monitor camera disposed at the public parking lot of a company or a large retail store provides an existence of parking lot vacancy, another vehicle and the pedestrian that the subject vehicle has not sensed by the captured information.

Figure 3:
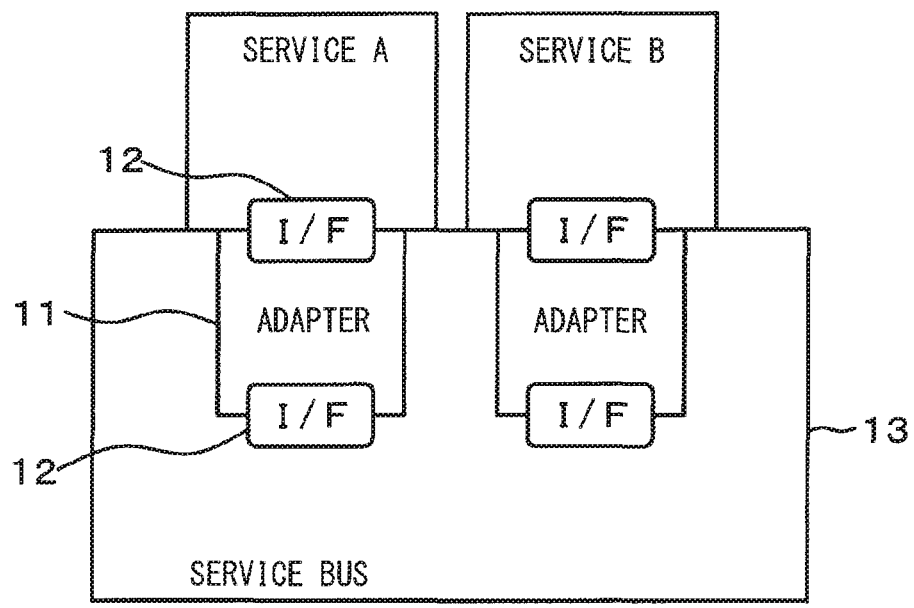
FIG. 3 is a diagram showing a relation between a service interface and a service bus.

The above described in-vehicle apparatus and external apparatus are incapable of mutually employing each other directly, and do not support service removal and service addition. Thus, in order to mutually employing respective functions that the in-vehicle apparatus and the external apparatus have, a service interface (hereinafter, referred to as service I/F) 12 and a service bus 13, as shown in FIG. 3, are provided. In the figures, the service I/F is referred to as I/F. The service I/F 12 is provided by an adapter 11, and the service bus 13 transmits and receives, under a predetermined protocol, a message including a request of a service or a response of a service.

The service bus 13 has a function of service management, which manages an installation position of service and the service removal and addition. Herein, the service removal and addition represents a removal of service or an addition of service. In the present embodiment, as shown in FIG. 1, the service bus 13 of the basic GW 2 is installed with a service manager (SM) 13a. The basic GW 2 has the function of information rooting among the domains, and the function that manages the installation position of service and the service removal and addition. The service bus 13 is connected with a hardware layer (H/W) 14 through the in-vehicle network 8.

When the application or the service employs another service, as shown in FIG. 3, another service is employed through the service I/F 12. With this configuration, an application developer need not study or consider a layer lower than the uppermost application layer. Since the service manager 13a manages the installation position of service and the service removal and addition, the application developer need not study or consider the installation position of the application and the application removal and addition.

The service I/F 12 is an interface provided by the adapter 11. The service I/F 12 enables the application or the service of the in-vehicle apparatus and the external apparatus to employ an existing function of another in-vehicle apparatus and another external apparatus as the service. The process in which the service I/F 12 enables the service and the application to employ the function as the service is referred to as the provision of function as the service. The application configured by multiple services is referred to as an integrated application.

Figure 4:
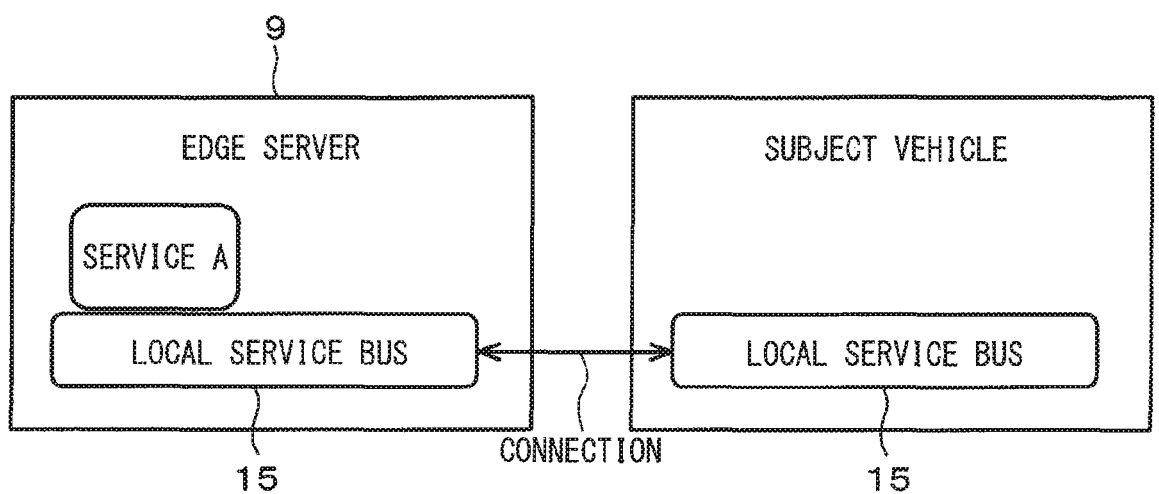
FIG. 4 is a diagram showing a use of a service of an edge server.
Figure 5:
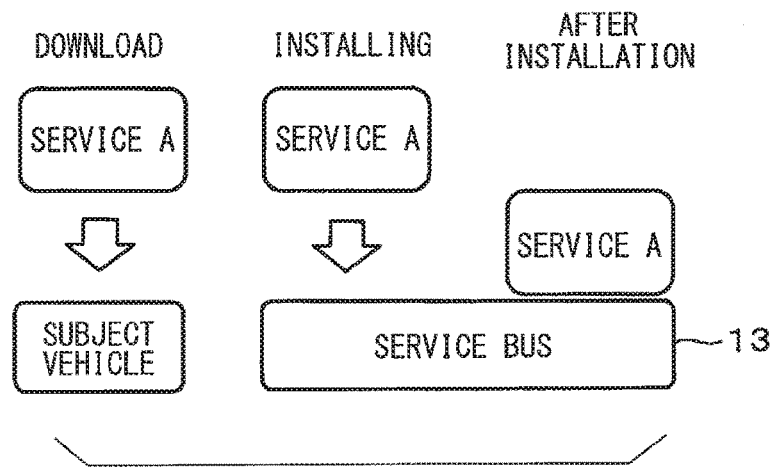
FIG. 5 is a diagram showing a conception for an installation of the service of the edge server to the service bus.

In order to achieve the provision of function as the service, each of the in-vehicle apparatus and the external apparatus is equipped with a local service bus 15, and a virtual service bus 13 is established by connecting each of the local service buses. As shown in FIG. 4, suppose that the in-vehicle apparatus installs a service A of the edge server 9 functioning as the external apparatus so that the service A is available for the in-vehicle apparatus. In this case, the service A is installed on the local service bus 15 of the external apparatus connected with the local service bus 15 of the subject vehicle. Thus, the service A is regarded as being installed on the service bus 13 even though the service A is not directly installed on the local service bus 15 of the subject vehicle.

The service A needs to be downloaded on the subject vehicle so that the service A is available for the subject vehicle. In the present embodiment, installing the service A on the subject vehicle represents moving the service A to the service bus 13 by installation of the service A on the service bus 13. As described above, with a development of the cloud environment, installing the service A on the in-vehicle apparatus can be done without download of the service A.

One local service bus 15 is capable of existing corresponding to one memory space. The memory space is generated by an operation system (OS) 16 shown in FIG. 1. When equal to or more than two memory spaces are generated in one CPU by the OS 16, the local service bus 15 exists corresponding to each of the memory spaces. With this configuration, the service bus 13 can be installed independently without depending on the specification or the configuration of the ECU configuring a physical arrangement lower than the layer of OS 16.

Figure 6:
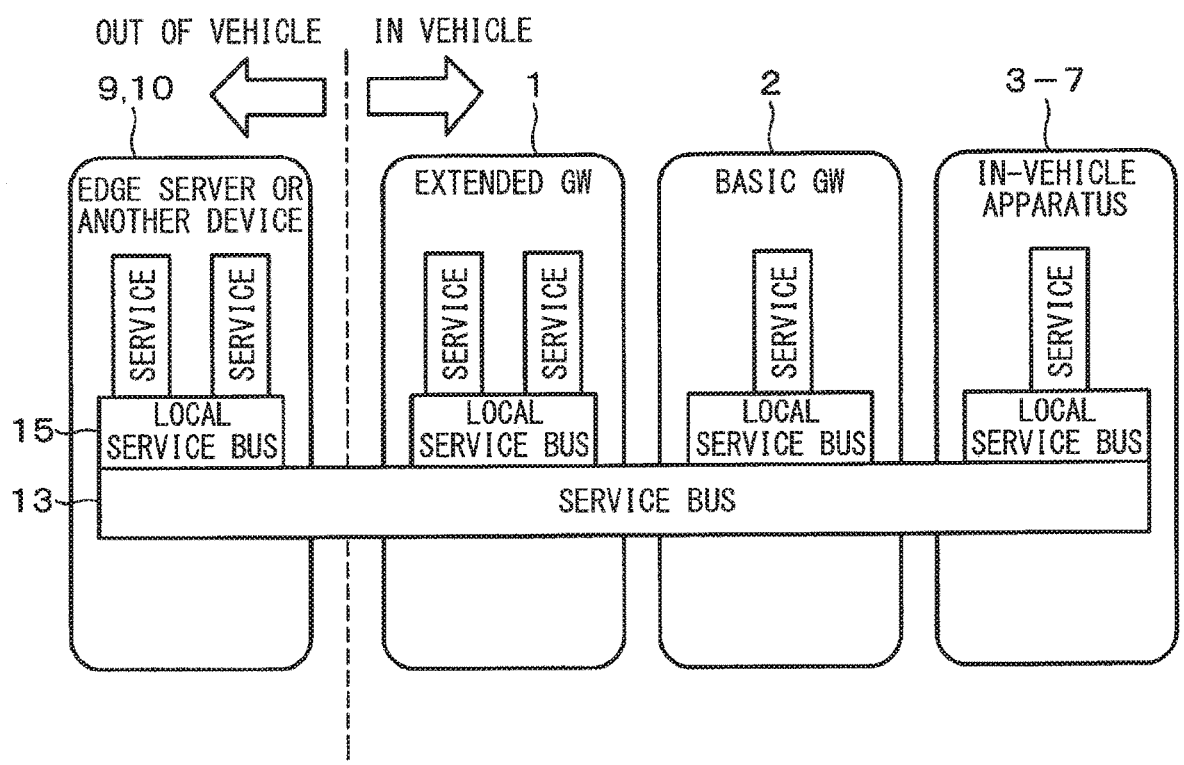
FIG. 6 is a diagram schematically showing cooperation provided by the service bus.

As shown in FIG. 6, the local service buses 15 are provided as middleware software installed to the in-vehicle apparatus, the external apparatus, and another device 10. The in-vehicle apparatus is provided by the GWs 1, 2, the display device 3, and each of the ECUs 4, 5, 6, 7. The external apparatus is provided by the edge server 9. Another device may be provided by the smartphone. Each of the local service buses 15 virtually configures one service bus 13 by being connected using an inter-application communication, an in-vehicle communication, and vehicle-to-external communication. In this configuration, the service bus 13 hides the lower-order layer, such as the in-vehicle communication. The hiding of lower layer is also known as encapsulation. Thus, a service developer can concentrate on a development of the application without considering the configuration of the lower-order layer. Thus, the service bus 13 can easily be rebuilt or expanded by adding an apparatus installed with the local service bus 15 to the existing service bus 13.

Figure 7:
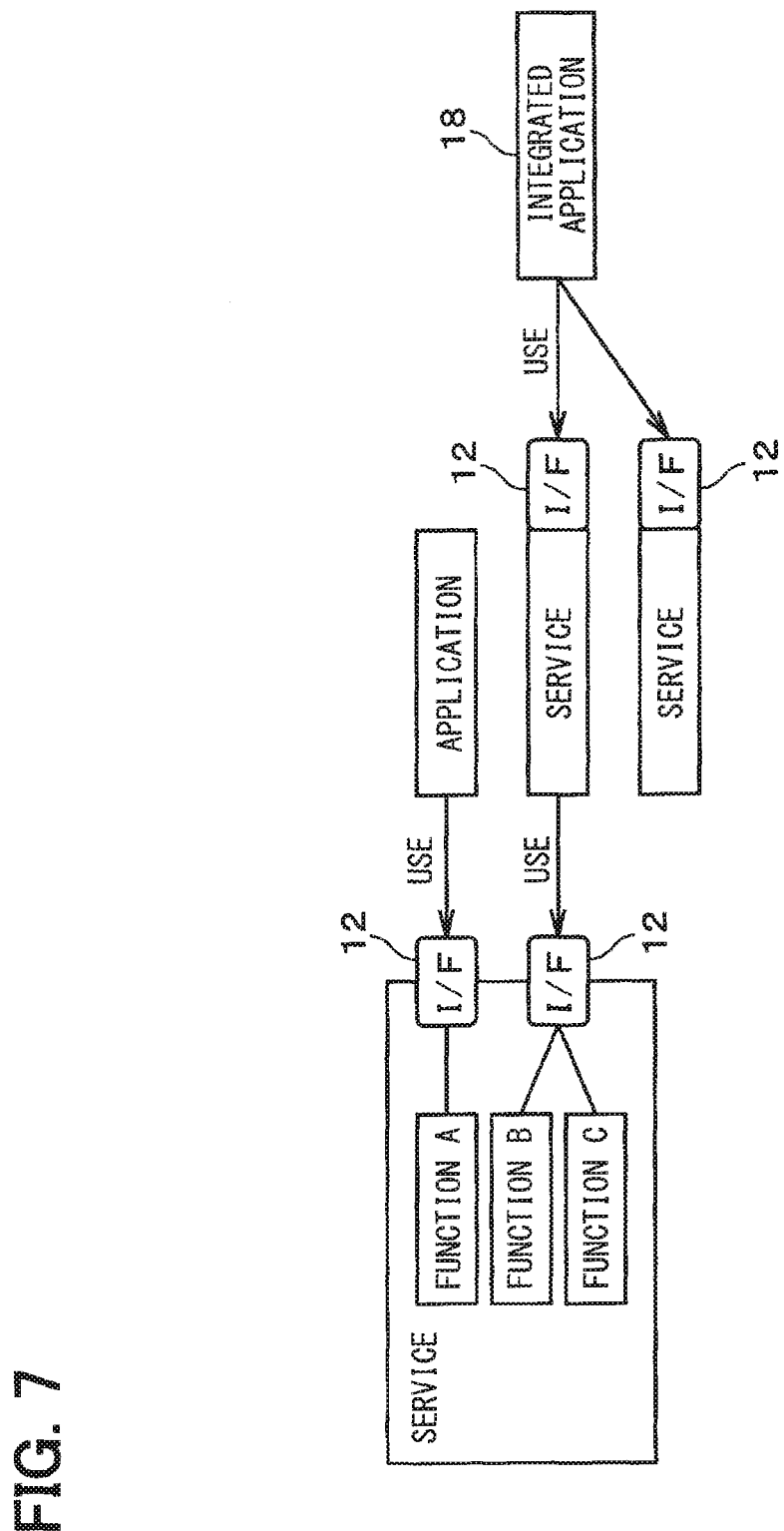
FIG. 7 is a diagram showing cooperation of the services provided by an integrated application.

As shown in FIG. 7, the service is mutually operable with another service by exchanging a message through the service I/F 12. This configuration is not limited to the use of the services with each other. The application is capable of employing the service, and the integrated application 18 is capable of employing the service, by exchanging a message through the service I/F 12.

Figure 8:
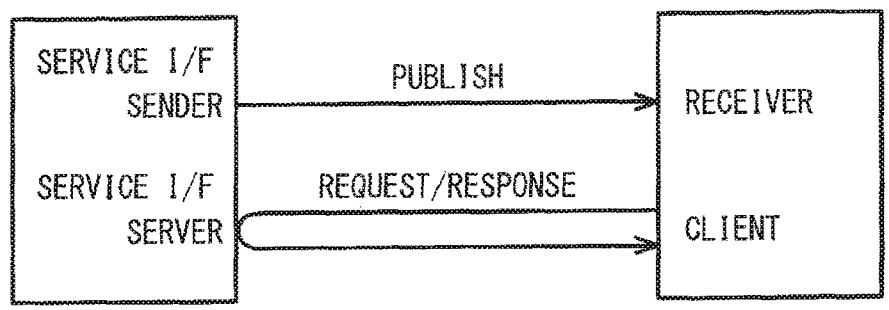
FIG. 8 is a diagram showing a protocol of service to service communication.

As shown in FIG. 8, protocols of service-to-service communication has a Request/Response manner protocol and a Publish/Subscribe manner protocol. The Request/Response manner protocol requests and responds to a message in one-to-one manner. The Publish/Subscribe manner protocol publishes a message to unspecified multiple subscribers.

In the Request/Response manner protocol, one service communicates with another service in one-to-one manner. When one subject service receives the request from another service, the service returns the response to another service in response to the request.

In the Publish/Subscribe manner protocol, one service communicates with multiple services in one-to-multiple manner. When one service publishes a message, the unspecified multiple services registered to subscribe are informed of the message. In the Publish/Subscribe manner protocol, the services registered to subscribe are configured to not respond to the publication.

The information, that is, a property provided by the service may include kinds of information shown in FIG. 9. The information includes a service ID, a service version, a service protocol, an employing service, an alternative service, an existing of influence on the vehicle control, priority of service transmission and reception, authority of connection, an installation position of the service, reliability, a service of another vehicle, the external service, a price, recommendation, a requirement for delay, an expiration time, a removal and addition unit, a security level, and a safety level. The service ID represents a name of the service. The service version represents a version of the service. Suppose that two or more services have the same name, and the services' versions are different from each other, the services are regarded as different services. The service version is necessary for keeping the service unique. The service protocol represents a communication protocol of the service, such as the Request/Response manner protocol, the Publish/Subscribe manner protocol. The employing service represents another service that is employed by the subject service. The alternative service represents the alternative service for safe travelling and safe stop. The alternative service is employed when the service for safe travelling and safe stop becomes unavailable. The existing of influence on the vehicle control represents the existing of influence on the straight travelling, curved travelling, and stop. When the service has an adverse influence on the vehicle control, the installation and update of the service during the travelling is forbidden. When the service does not have an adverse influence on the vehicle control, the installation and update of the service during the travelling is allowed. The priority of service transmission and reception is employed in a priority control when arbitration needs to be carried out among multiple services. The authority of connection represents the authority of connection to the priority of service transmission and reception. For example, when a generation of a cooperated service for controlling the brake is easily authorized, the travelling safety may not be ensured. The installation position of the service represents a constraint to establish the service. The constraint may include a physical distance between the subject service and another service. The reliability represents a manufacturer of the service. The service of another vehicle represents a service installed to another vehicle which is allowed to be connected with the subject service. The external service represents the external service which is allowed to be connected with the subject service. The external service may include cloud service and smartphone service. The price represents the price of the service. The recommendation represents a recommendation level of the service. The requirement for delay represents a communication delay time that is necessary for establishing the subject service. The expiration time may also include an existence of an automatic update. The removal and addition unit represents a unit of the removal and addition. The removal and addition may be executed in units of applications, in units of ECUs, in units of domains, or in units of vehicles. The security level represents a security level of the subject service. The safety level represents a safety level of the subject service. Information other than the information shown in FIG. 9 may be employed. The functions of service bus 13 includes a service bus management, a service management, and a service execution.

The service bus management function activates the service bus 13 when the service bus 13 receives an activation request transmitted from the vehicle system or the service. The service bus management function deactivates the service bus 13 when the service bus 13 receives a deactivation request transmitted from the vehicle system. The service bus management function manages an operation state of the service bus 13.

The service management function installs, uninstalls, and updates the service when the service bus 13 receives a request of service management for installation, uninstallation, and update, respectively. The service management function activates the service when the service bus 13 is activated or the service bus 13 receives the request of service management for an activation. The service management function deactivates the service when the service bus 13 is deactivated or the service bus 13 receives the request of service management for a deactivation. The service management function manages an operation state of the service.

The service execution function executes a provider service when the service bus 13 receives an execution request of a consumer service. The provider service is a service configured to provide another service. The consumer service is a service configured to employ another service. The service execution function provides a solution for an installation position of the provider service, that is, the service execution function has location transparency. The service execution function executes an access control, which determines permission or rejection, to each provider service in response to the received consumer service when the consumer service is transmitted by a service user. The service execution function executes a priority control in units of the services or in units of the message.

When the application or the service of the in-vehicle apparatus or the external apparatus employs another service, the service bus 13 provides a solution for an installation position of another service. Thus, a subject service on each apparatus is capable of employing another service without considering the installation position of another service. This configuration corresponds to the position transparency of the service.

Figure 10:
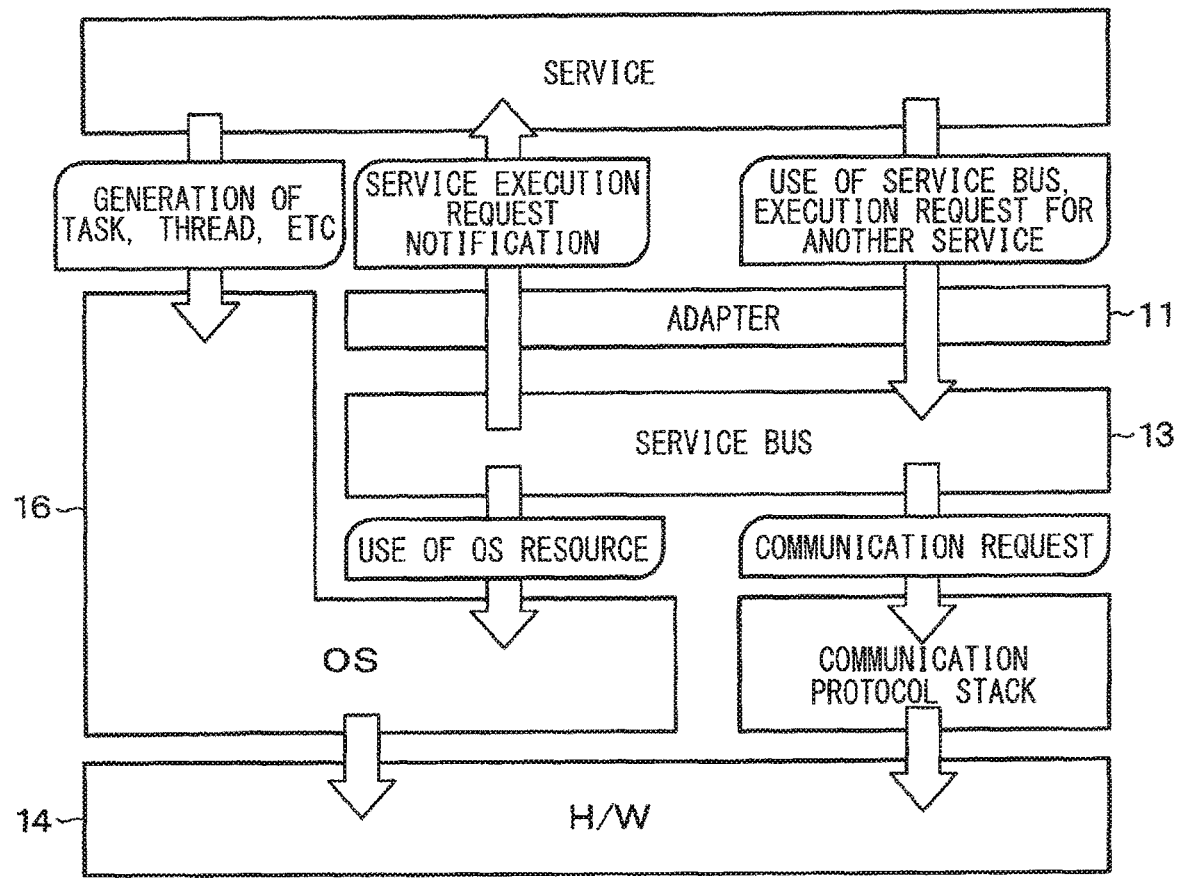
FIG. 10 is a diagram showing a function of the service bus.

As shown in FIG. 10, the service bus 13 and the adapter 11 are positioned in a software configuration layer. The local service bus 15 is provided as implementation body of the service bus 13.

The service bus 13 is installed on the OS 16 and communication protocol stack, such as CAN or Transmission Control Protocol and the Internet Protocol (TCP/IP). With this configuration, the cooperation among each of the services is achieved. The adapter 11 provides the service IF 12 for the service, and notifies the service bus 13 of the request received from the service.

Figure 11:
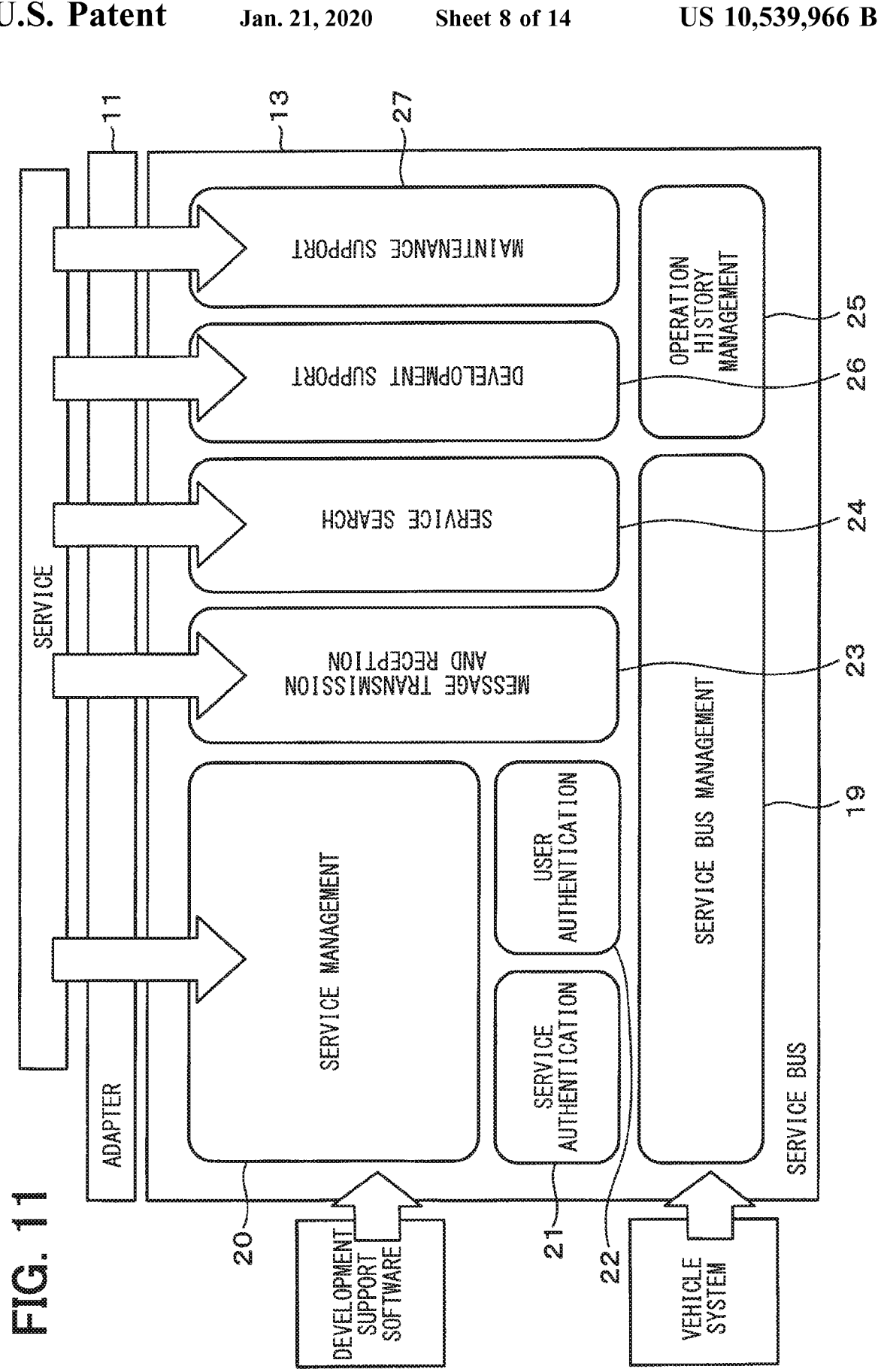
FIG. 11 is a diagram showing modules configuring the service bus.

As shown in FIG. 11, the service bus 13 has modules including a service bus management 19, a service management 20, a service authentication 21, a user authentication 22, a message transmission and reception 23, a service search 24, an operation history management 25, a development support 26, and a maintenance support 27.

The service bus management 19 controls activation and deactivation of the service bus 13, keeps another service is available for each service of each apparatus, and keeps each service of each apparatus is available for another service.

The service management 20 manages the service on the service bus 13, and controls the operation of the service.

The service authentication 21 authenticates the service installed on the service bus 13.

The user authentication 22 authenticates an end user employing the service bus 13.

The end user represents a person who accesses the service bus 13 through the consumer service, the provider service or a development assist soft. The end user may include a vehicle owner and the service developer.

The message transmission and reception 23 transmits and receives the information, that is, the message communicating on the service bus 13.

The service search 24 searches the service on the service bus 13.

The operation history management 25 collects and provides a service during the operation state of the service bus 13 and an operation history of the service bus 13.

The development support 26 provides a function that supports a development of the service and the service bus 13.

The maintenance support 27 provides a function that supports maintenance of the service during the operation of the service bus 13.

When the service is installed to the service bus 13, the installation is mainly executed by an installation management service. In a configuration where the integrated application 18 employs the service of the edge server 9 or the service of another device 10, the installation management service is installed to the extended GW 1, which communicates with an external apparatus.

Figure 12:
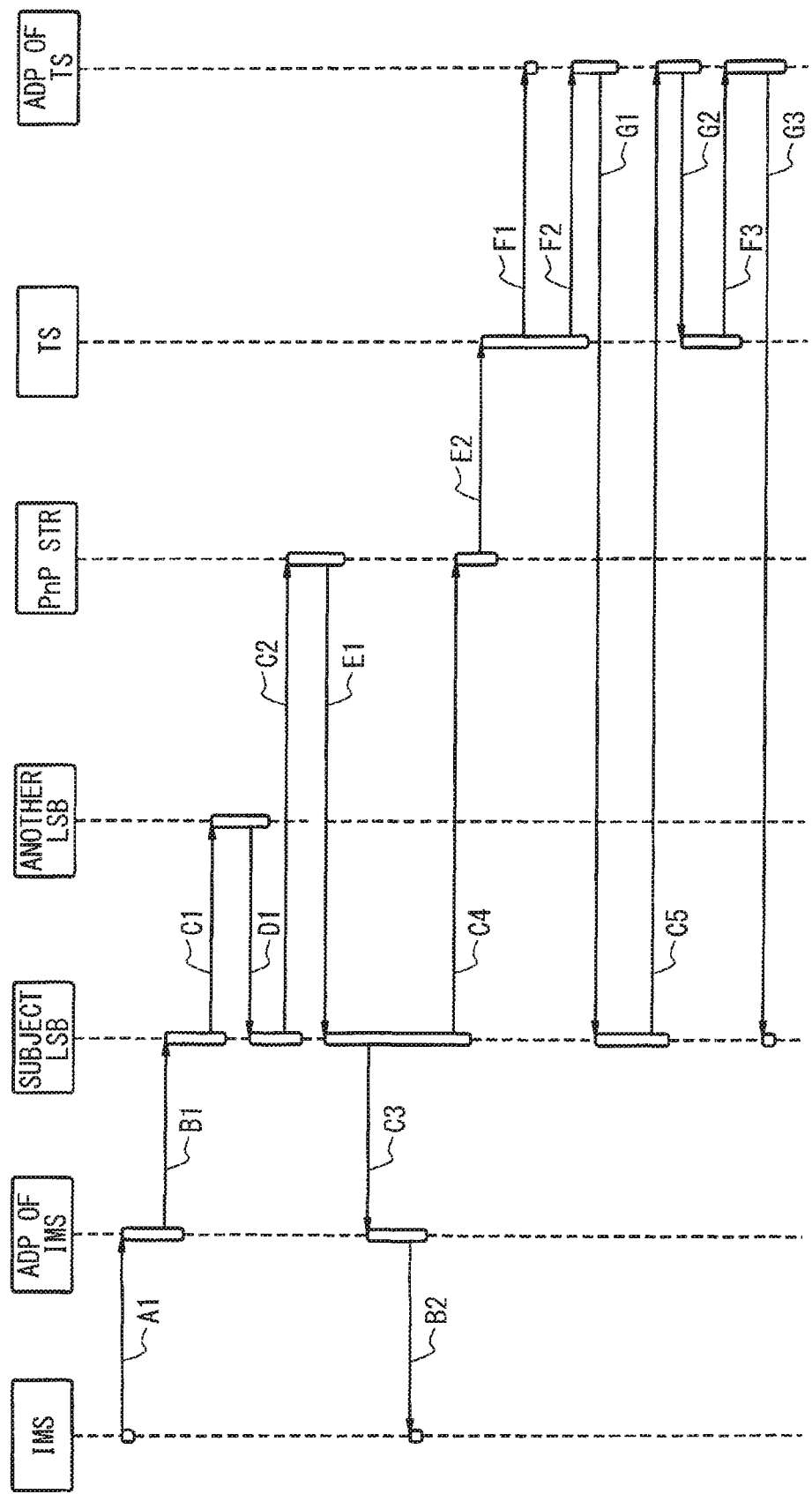
FIG. 12 is a diagram showing a process of the installation of the service to the service bus.

The following will describe the process of the installation of the service executed by the installation management service. As shown in FIG. 12, the installation management service (IMS) requests the own adapter to install the service, as shown by symbol A1. In FIG. 12, the adapter of the installation management service is referred to as ADP OF IMS. The adapter forwards, to the subject local service bus (SUBJECT LSB), the request received from the installation management service, as shown by symbol B1.

In response to the installation request from the installation management service, the adapter of the installation management service requests another local service bus (ANOTHER LSB) to determine whether the service is capable of being installed, as shown by symbol C1 through the subject local service bus. In response to the installation request from the installation management service, another local service bus determines whether the service is capable of being installed. Another local service bus returns a response indicating the determination result determined by another local service bus to the subject local service bus of the installation management service, as shown by symbol D1.

When another local service bus determines the service is capable of being installed, the subject local service bus of the installation management service installs the service on a plug and play (PnP) structure (PnP STR) configuring the service bus, as shown by symbol C2.

When the service is successfully installed on the PnP structure, the PnP structure submits a response to the subject local service bus of the installation management service, as shown by symbol E1. According to the response, the subject local service bus of the installation management service informs the service installation to the own adapter, as shown by symbol C3. The own adapter notifies of the service installation to the installation management service, as shown by symbol B2. In this configuration, the installation management service can determine whether the service is successfully installed.

The subject local service bus of the installation management service transmits an activation request of the installed service to the PnP structure, as shown by symbol C4. In response to the request from the subject local service bus of the installation management service, the PnP structure transmits an activation request to a target service (TS) which has been installed, as shown by symbol E2. In response to the request from the PnP structure, the target service transmits an activation request to the adapter of the target service (ADP OF TS), as shown by symbol F1 and transmits a request for registration of the service information, as shown by symbol F2.

When the service information is registered, the adapter of the target service notifies the information registration to the subject local service bus of the installation management service, as shown by symbol G1. With this configuration, the subject local service bus of the installation management service can determine whether the installed service is available. The subject local service bus of the installation management service requests the adapter of the installing service to start the target service as shown by symbol C5, and the adapter of the target service forwards the start request to the target service, as shown by symbol G2.

In response to the start request, the target service is started, and then the target service responds to the own adapter regarding the start of the service, as shown by symbol F3. The adapter of the target service transmits a response indicating start of the target service to the local service bus of the installation management service, as shown by symbol G3. With this configuration, the local service bus of the installation management service can determine that the service that has been installed becomes available.

Suppose that the in-vehicle apparatus that does not installed with the local service bus 15 is mounted on the subject vehicle. In this case, the integrated application 18 is incapable of employing the function of the in-vehicle apparatus, because the in-vehicle apparatus is incapable of establishing the service bus 13.

Figure 13:
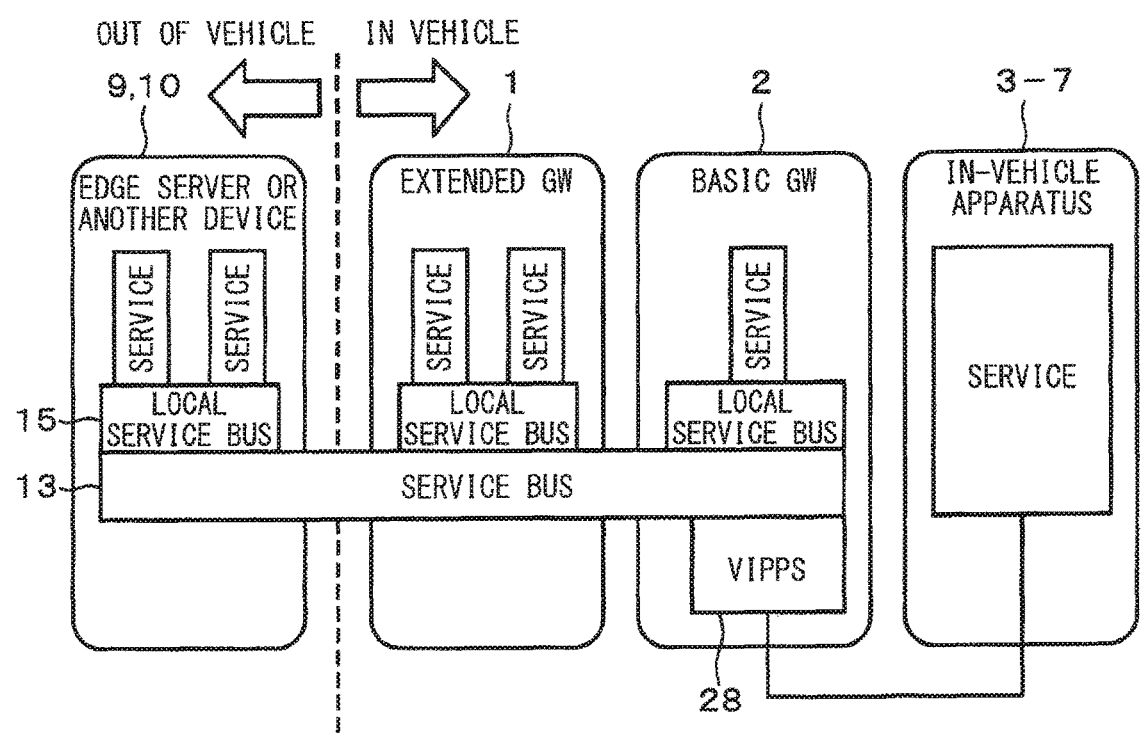
FIG. 13 is a diagram schematically showing a cooperation provided by a vehicle information provision proxy service.

Suppose that the integrated application 18 employs the function of the in-vehicle apparatus without the local service bus. In this case, as shown in FIG. 13, the basic GW 2 is installed with a vehicle information provision proxy service (VIPPS) 28. The vehicle information provision proxy service 28 relays the message between the in-vehicle apparatus that does not have the local service bus 15 and the service bus 13, and functions as a translator of the message.

With this configuration, the integrated application 18 installed on the basic GW 2 can employ the function of the in-vehicle apparatus that does not have the local service bus 15. Thus, the basic GW 2 is capable of managing a vehicle control service. In this case, the vehicle information provision proxy service 28 relays the communication between the service bus 13 and the in-vehicle apparatus, which does not have the service I/F 12 and the adapter 11. Thus, the basic GW 2 is capable of hiding the in-vehicle apparatus.

The vehicle information provision proxy service 28 can absorb difference between the protocol employed in the cloud or the edge server 9 and the protocol of the service bus 13 when performing the message transmission or reception with the cloud or edge server 9. The vehicle information provision proxy service 28 can absorb difference between the CAN protocol employed in the ECUs 4, 5, 6, 7 which do not have the local service bus 15 and the protocol of the service bus. The vehicle information provision proxy service 28 can absorb difference between the protocols used in the transmission and reception of the service bus message.

Figure 14:
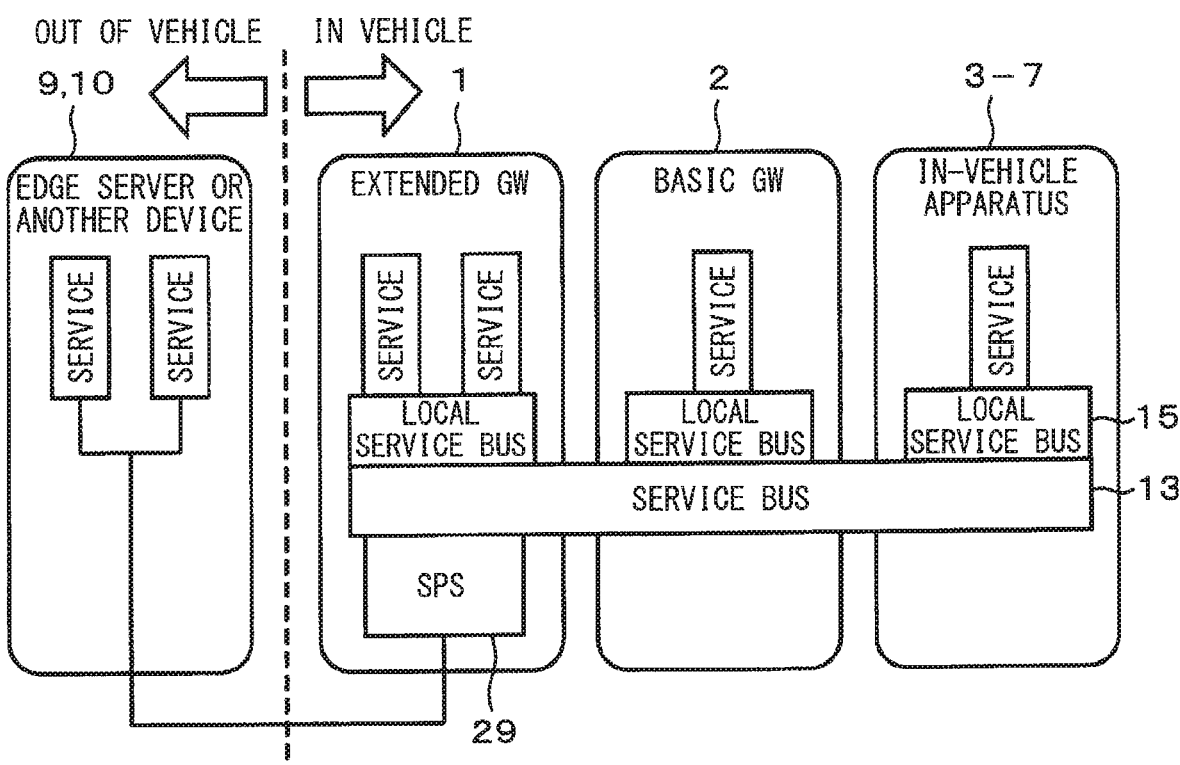
FIG. 14 is a diagram schematically showing a cooperation provided by a server proxy service.

Suppose that the edge sever 9 does not have the local service bus 15, and thus the edge server 9 is incapable of being connected with the service bus 13. In this case, as shown in FIG. 14, a server proxy service 29 (SPS) is installed to the extended GW 1. The server proxy service 29 relays the message between the service bus 13 of the vehicle and the edge server 9, and functions as the translator of the message.

With the above-described configuration, the external apparatus is not necessary to install the local service bus 15. Thus, a normal external apparatus without the local service bus 15 can perform a communication with the in-vehicle apparatus. The extended GW 1 is capable of hiding the in-vehicle apparatus.

Suppose that the edge server 9 has the integrated application 18, and an external apparatus can control a virtual vehicle, specifically, manages the vehicle control service, with use of the integrated application 18. In this case, a brain executing the vehicle control is provided on the external apparatus, and hand and foot actually controlling the vehicle is provided on the vehicle. With this configuration, only the control-related service requiring higher real-time performance needs to be downloaded on the vehicle. This configuration can reduce a control processing load of the vehicle.

The above-described configuration can support the self-driving of the vehicle located in the edge area and integratedly control multiple vehicles located in the edge area. With this kind of configuration in which the external apparatus controls the vehicle, the security vulnerability is concerned.

Figure 15:
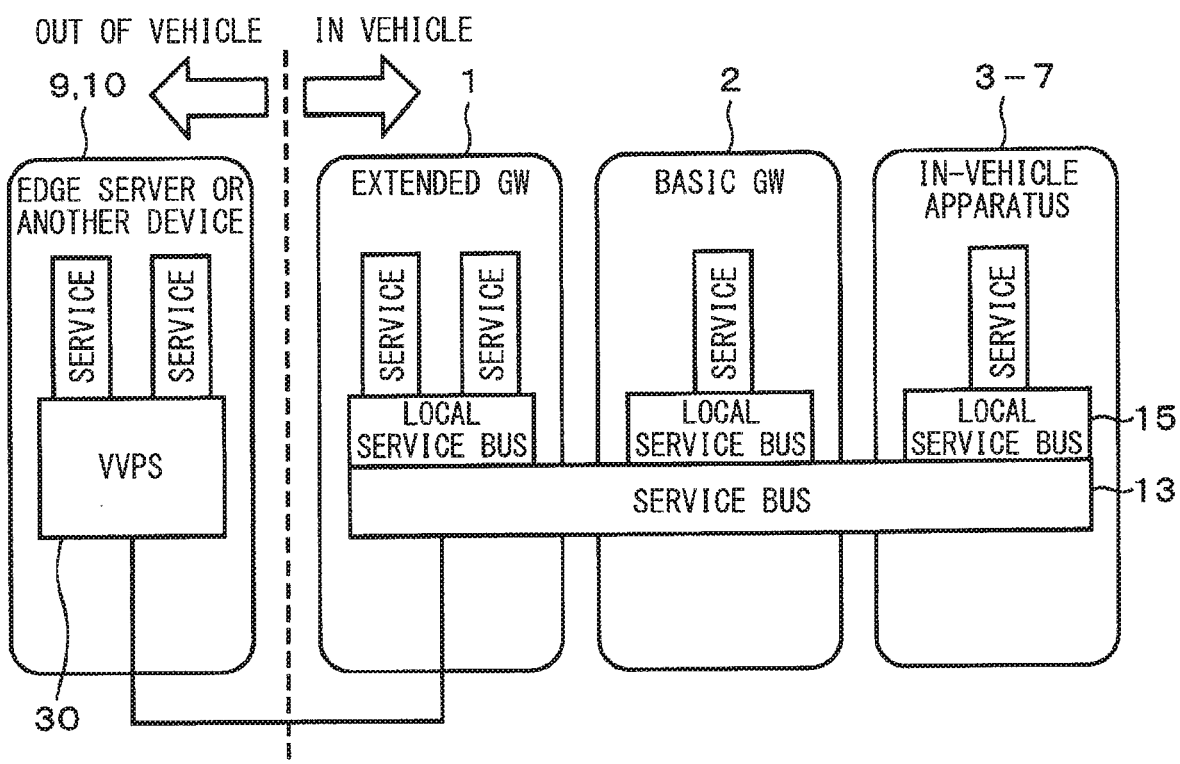
FIG. 15 is a diagram schematically showing a cooperation provided by a virtual vehicle proxy service.

As shown in FIG. 15, the edge server 9 has a virtual vehicle proxy server (VVPS) 30. The virtual vehicle proxy server 30 relays the message between the service bus 13 of the vehicle and the edge server 9, and functions as the translator of the message. Suppose that each edge server 9 has a different translation regulation, that is, protocol of the virtual vehicle proxy server 30 from another edge server 9. In this case, the different protocols of the virtual vehicle proxy servers 30 may be open on the cloud server so that the vehicle is capable of obtaining the corresponding protocol from the cloud server. By obtaining the protocol, the vehicle is capable of transmitting or receiving the message generated under the protocol.

With the above-described configuration, the edge server 9 having the virtual vehicle proxy server 30 can absorb vehicle specification difference due to different original equipment manufacturers (OEM), vehicle type difference, and sensor difference in the edge server 9. With this configuration, the security can be secured.

When the subject vehicle operates the self-driving by the autonomous control, the self-driving can be basically operated by the autonomous control based on the sensing information detected by the subject vehicle. When traveling in a traffic network where the subject vehicle is incapable of sensing the obstacle, the subject vehicle is capable of employing another sensing information obtained from, for example, the monitor camera for supporting the self-driving. In this case, the subject vehicle may employ the sensing information that is integratedly managed by the cloud server.

It takes much time for the subject vehicle to obtain the sensing information, which is collected by the cloud server, from the cloud server. This may happen when the cloud server is located physically far from the subject vehicle, or the cloud server has a huge amount of the information that takes much time to process. The data amount on the cloud server for the integrated management rapidly increases. The amount of the cloud server is small relative to the amount of the vehicle or the data. These factors also cause low responsiveness of the cloud server. This low responsiveness of the cloud server degrades the response speed of the cloud cooperation. Thus, the configuration has difficulty to respond to the traffic situation that requests high responsiveness.

With the above-described configuration, the edge server 9 functioning as the edge of the cloud server can provide improvement of the response speed. The edge server 9 disposed between the cloud server and the subject vehicle can increase variety of services that are provided by the external apparatus.

The service that the external apparatus can provide may include the self-driving, a telematics service, a high level drive support, and a big data service.

The self-driving is the service employed by the vehicle and needs the high response speed. The self-driving may include controls for automatic traveling along the same lane, detection of a dead area, an auto valet parking, support for passing-each-other travelling, and displaying a distance between another vehicle and the subject vehicle.

The telematics service is a service cooperating with another telematics service provided out of the vehicle. The telematics service may include: an emergency call (eCall); a Breakdown Call (bCall); a remote starter; a backward traveling assist; a monitor of driving state of driver; a home electric appliances control; a home energy management system (HEMS) control; an entertainment cooperation, such as audio and video; an in-vehicle air-conditioner control; and an excessive speed restriction support.

The high level drive support is a service that is provided in the edge area. The high level drive support may include a notification of pedestrian leaping out to the road, an information provision for periphery and dead area, a support regarding front dead area, a reservation for electric vehicle (EV) power charge, a home security, a door control, a light control, and a horn control.

The big data service is a service that the cloud server mainly provides and needs a lot of information. The big data service may include: a cloud vehicle diagnosis in which the cloud server diagnoses the vehicle; an attack monitor in which the cloud server monitors a security hole on a communication security, and distributes a batch software for dealing with the security hole; an over the air (OTA) reprogram in which the cloud server rewrites a software of the vehicle via the communication with the vehicle; a traveling management of the vehicle; an automatic generation of high-accuracy map; a suggestion of car insurance based on a driving aptitude; tracking of stolen car; a notification of parking lot vacancy; a smart grid control; a driving diagnosis or fuel economy; and a car sharing management system.

The following will describe a case where the integrated application 18 employs the in-vehicle service in cooperation with the external service provided by the edge server 9 through the service bus 13. The integrated application 18 determines whether the subject vehicle is likely to collide with an obstacle based on the position information of the subject vehicle, another vehicle, and the pedestrian provided by the edge server 9. When the integrated application 18 determines the subject vehicle is likely to collide with another vehicle or the pedestrian, the integrated application 18 displays an alert on the display device 3.

Figure 16:
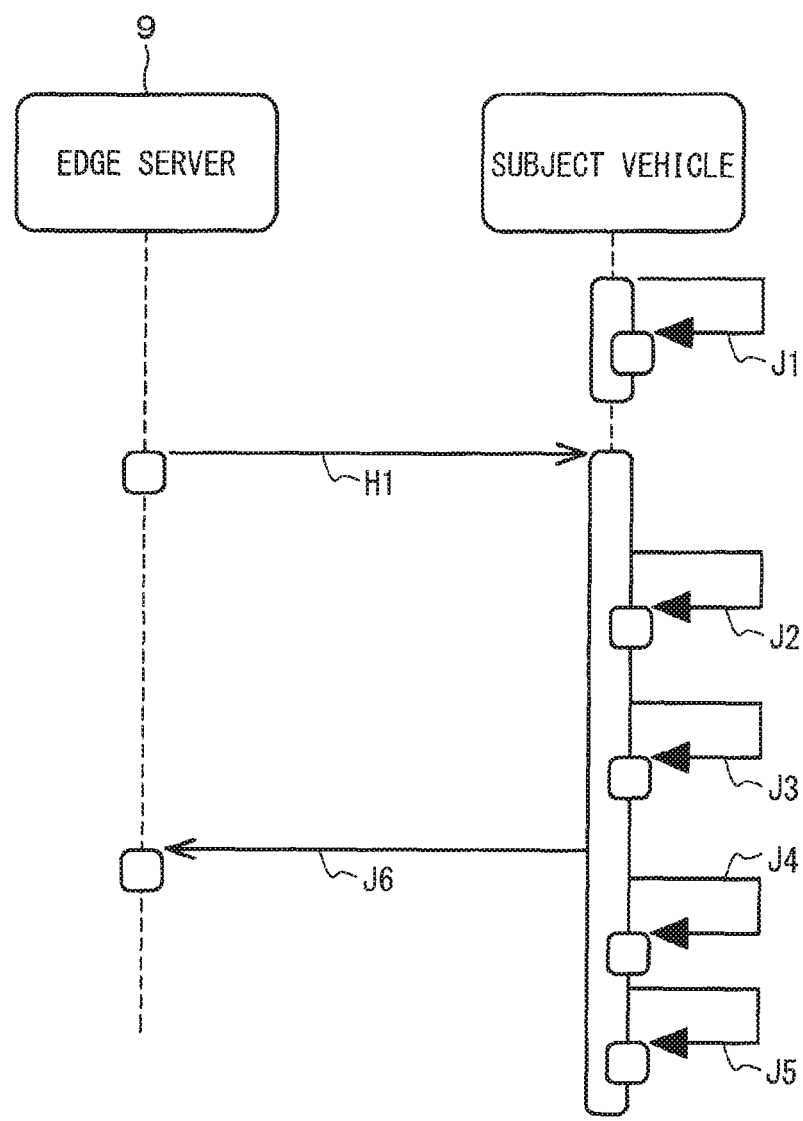
FIG. 16 is a diagram showing a use of process of the in-vehicle service and the external service by cooperating with each other.

As shown by symbol J1 in FIG. 16, suppose that the subject vehicle is determined to enter the edge area which provides the external service. Specifically, the position information provision service of the locator ECU 4 determines whether the vehicle enters the edge are based on the vehicle location. The edge server 9 notifies the subject vehicle that the edge server 9 has the service available for the subject vehicle, as shown by symbol H1. The subject vehicle authenticates the external service, as shown by symbol J2. The installation management service inquires the service bus 13 whether the target in-vehicle service to be employed by the external service exists, as shown by symbol J3. In this case, when the necessary minimum in-vehicle service to achieve the integrated application 18 does not exist, the process ends. When the vehicle has the necessary minimum in-vehicle service to achieve the integrated application 18 but does not have all of the in-vehicle services or in-vehicle sensors for achieving the integrated application 18, the quality of the operation of the service may differ from a case where the vehicle has all of the in-vehicle services or in-vehicle sensors for achieving the integrated application 18. For example, in the dead area avoidance application, when the brake service, which is one of the services of the brake ECU 5, is installed to the brake ECU 5, the dead area avoidance application controls the brake to stop the vehicle. When the brake service is not installed to the brake ECU 5, the dead area avoidance application displays the alert on the display device 3 using the image display service.

When the integrated application 18 employs the in-vehicle service and the external service at the same time, (i) the in-vehicle service and the external service employed by the integrated application 18 are connected by the service bus 13 as shown by symbol J6, and 34, and then (ii) the in-vehicle service and the external service are cooperated with each other so that the integrated application 18 is provided to the user, as shown by symbol J5. With this configuration, the integrated application 18 can provide the user with the service in which the in-vehicle service and the external service are cooperated with each other.

Figure 17:
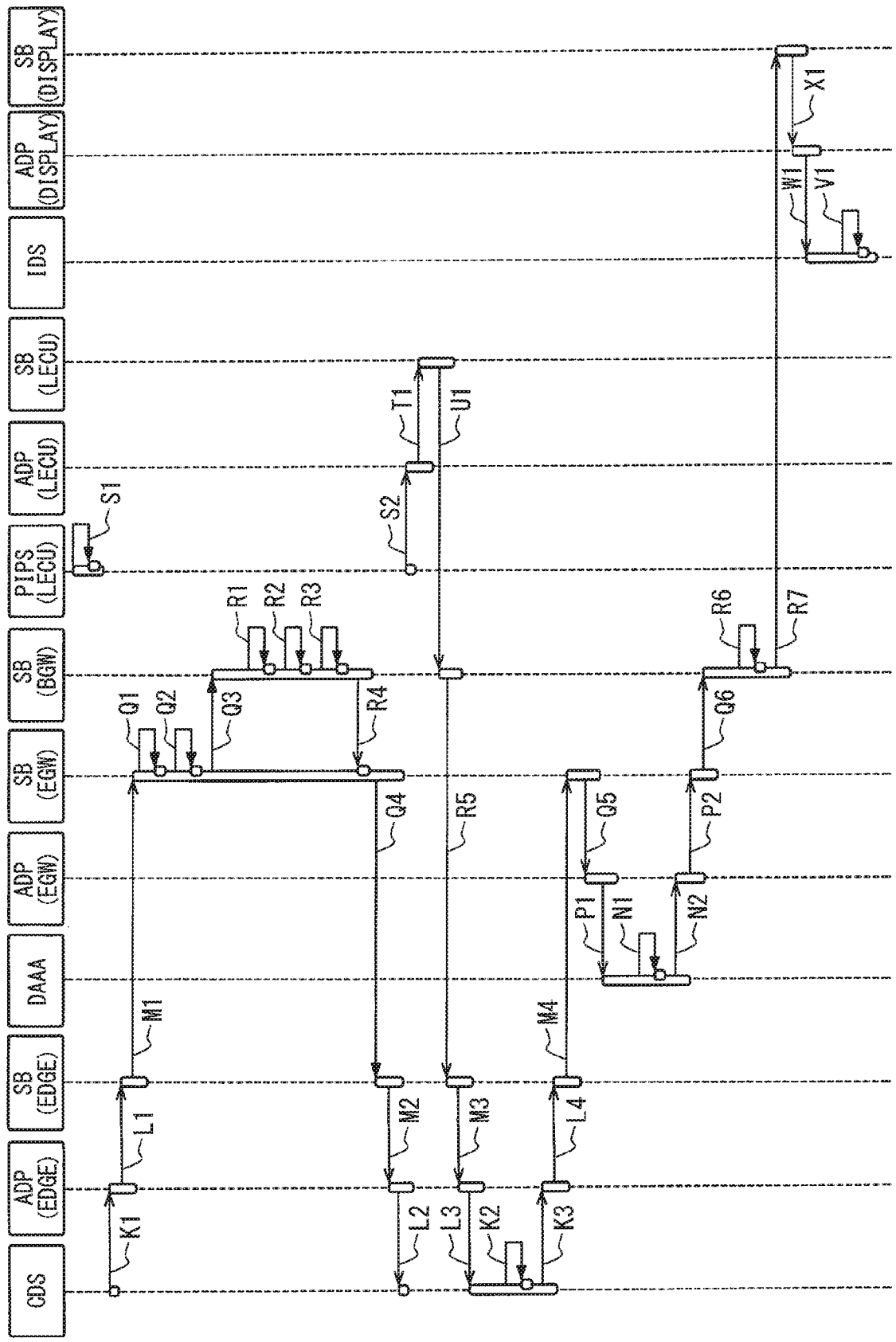
FIG. 17 is a diagram showing a dead area avoidance application's use of process of the in-vehicle service and the external service by cooperating with each other.

The following will describe the dead area avoidance as an cooperation example in which the in-vehicle service and the external service are cooperated with each other, as shown in FIG. 17. The position information provision service of the locator ECU 4 publishes the location information repeatedly and determines whether the vehicle enters the edge area based on the location information, as shown by symbol S1. In FIG. 17, the position information provision service of the locator ECU is referred to as PIPS (LEUC).

The edge server 9 having the external service notifies the vehicles in the edge area of the existence of the external service. The notification is executed through the adapter 11 of the edge server 9, the service bus 13 of the edge server 9, and the service bus 13 of the extended GW 1 in the described order, as shown by symbols K1, L1, and M1. In FIG. 17, the adapter of the edge server is referred to as ADP (EDGE), the service bus of the edge server is referred to as SB (EDGE), and the service bus of the extended GW is referred to as SB (EGW).

When the subject vehicle enters the edge area of the edge server 9, (i) the service bus 13 of the extended GW 1 authenticates the external service, as shown by symbol Q1, and (ii) the external service inquires the service bus 13 of the basic GW 2 whether the in-vehicle service to be employed by the external service exists in the subject vehicle, as shown by symbols Q2, and Q3. In FIG. 17, the service bus of the basic GW is referred to as SB (BGW).

The basic GW 2 (*i*) inquires the service bus 13 whether the in-vehicle service to be employed by the external service exists in the subject vehicle, as shown by symbol R1, (ii) executes a subscription process for the external service, as shown by symbol R2, and (iii) executes an access control to the service subscribed by the basic GW 2, as shown by symbol R3. When the in-vehicle service to be employed by the external service exists, the basic GW 2 accepts the use of the external service. This acceptance is notified to the collision determination service of the edge server 9, through the service bus 13 of the extended GW 1, the service bus 13 of the edge server 9, and the adapter 11 of the edge server 9 in the described order, as shown by symbols R4, Q4, M2, and L2.

The collision determination service of the edge server 9 receives the publication notification from the subject vehicle. The position information provision service of the locator ECU 4 publishes the location information, as shown by symbol S2. The publication notification is notified to the collision determination service of the edge server 9 through the adapter 11 of the locator ECU 4, the service bus 13 of the locator ECU 4, the service bus 13 of the basic GW 2, the service bus 13 of the edge server 9, and the adapter 11 of the edge server 9 in the described order, as shown by symbols S2, T1, U1, R5, M3, and L3. In FIG. 17, the adapter of the locator ECU is referred to as ADP (LECU), and the service bus of the locator ECU is referred to as SB (LECU). The collision determination service executes a publication reception process, and determines whether the subject vehicle is likely to collide with the pedestrian or another vehicle based on the collected position information of another device 10 in addition to the subject vehicle's position information acquired from the subject vehicle, as shown by symbol K2. When determining that the subject vehicle is likely to collide with the pedestrian or another vehicle, the collision determination service transmits a request to the dead area avoidance application of the extended GW 1 to display a possibility of collision. The request is transmitted through the adapter 11 of the edge server 9, the service bus 13 of the edge server 9, the service bus 13 of the extended GW 1, and the adapter 11 of the extended GW 1 in the described order, as shown by symbols K3, L4, M4, Q5, and P1. In FIG. 17, the adapter of the extended GW is referred to as ADP (EGW). After the notification is transmitted to the dead area avoidance application, the dead area avoidance application executes a request reception process, and alerts the possibility of collision on the display device 3, as shown by symbols N1. The dead area avoidance application transmits a request to the service bus 13 of the display device 3 to display the alert for the possibility of collision. In FIG. 17, the service bus of the display device is referred to as SB (DISPLAY). The request is transmitted through the adapter 11 of the extended GW 1, the service bus 13 of the extended GW 1, and the service bus 13 of the basic GW 2 in the described order, as shown by symbols N2, P2, Q6, and R7. Herein, the service bus 13 of the basic GW 2 executes the access control to the service requested by the collision determination service, as shown by symbol R6.

The image display service of the display device 3 receives the request for the display of the alert from the service bus 13 through the adapter 11 of the display device 3, as shown by symbols X1, and W1. In FIG. 17, the adapter of the display device is referred to as ADP (DISPLAY). The image display service of the display device 3 executes the request reception process, and displays the alert on the display device 3, as shown by symbols V1. Alternatively, the alert may be executed in an audio manner by outputting an audio guidance using an audio notification service.

With the above-described configuration, even though the pedestrian or another vehicle exists in the dead area of the intersection or the like, the possibility of the collision is displayed on the display device 3. Thus, a driver can pay attention to the dead area during the driving, and the possibility of the collision is substantially reduced before the occurrence of collision.

When the external services employed by the integrated application 18 shift over time along with the vehicle traveling, the service provision by a static rewrite of software makes it difficult to execute dynamic cooperation with the external service requiring the punctual real-time performance. The dynamic cooperation represents the use of service under the current operation state of the system without restarting the system.

The following will describe the dynamic rewrite for cooperating with the external service requiring the punctual real-time performance. The dynamic rewrite is executed in each edge area corresponding to the specification of the subject vehicle. With this dynamic rewrite, the operation of the subject vehicle is changeable. The dynamic rewrite represents the installation of the new application to the extended GW 1. Herein, the newly installed application generates the integrated application 18 which employs a vehicle control function. Herein, the vehicle control function is provided as the service via the service I/F and the adapter.

Figure 18:
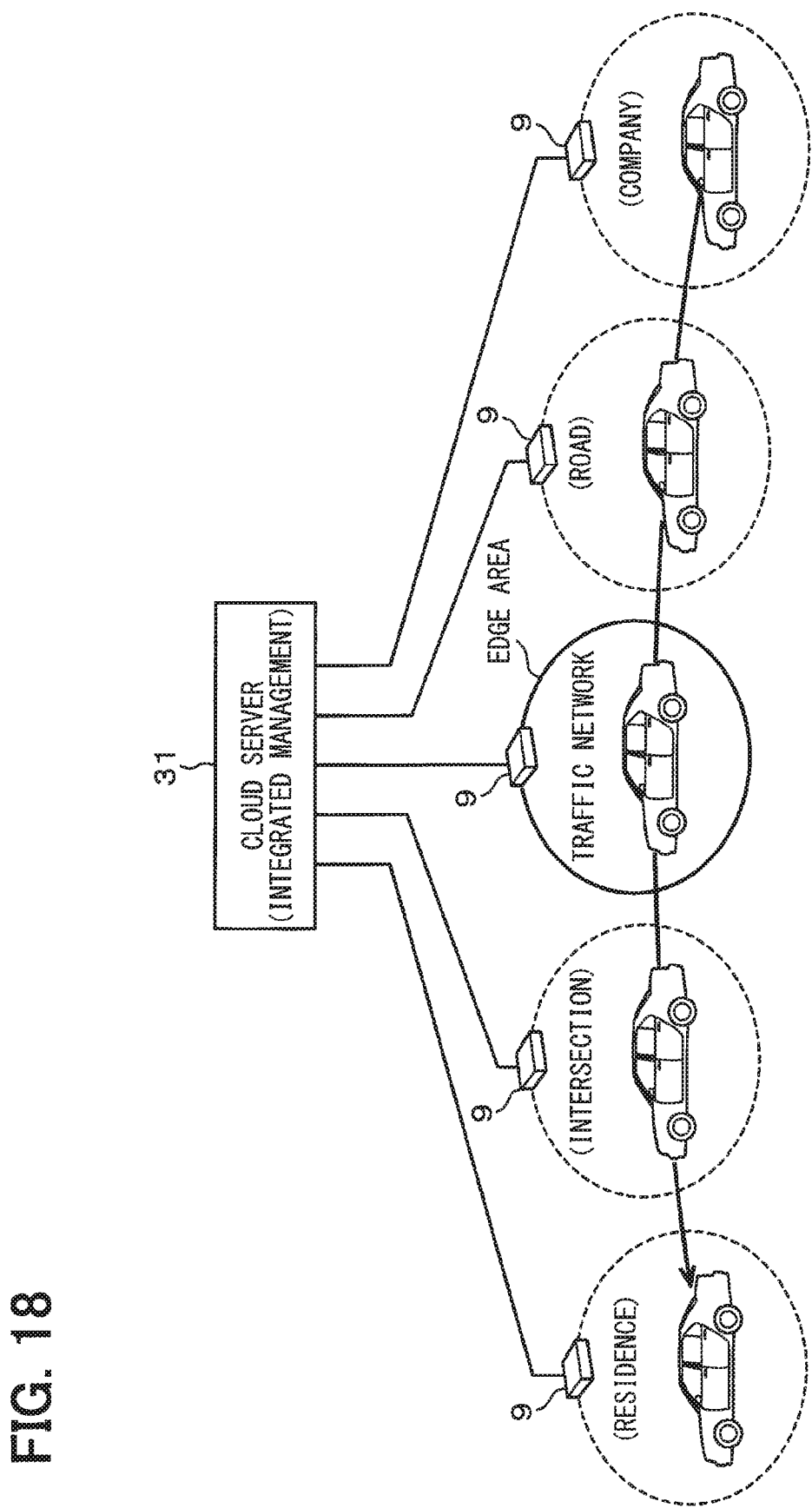
FIG. 18 is a diagram showing an edge area determined in a traffic network.

FIG. 18 shows an example of the generation of the integrated application 18 in each edge area. In FIG. 18, the multiple edge areas each of which functions as a short range communication area of each edge server 9 that is connected to the cloud server 31 are disposed in the traffic network. The traffic network may include the parking lot of company, the traveling road, the intersection, and residence. When entering the edge area, the subject vehicle (i) installs the service via the communication with the edge server 9 of the corresponding edge area, (ii) generates the integrated application, and (iii) subsequently executes the service corresponding to the edge area.

When the subject vehicle is likely to collide with another vehicle, the pedestrian, or the like, the brake control needs to be performed. In this case, the subject vehicle adds the brake ECU 5, brake ECU adapter 11, brake ECU service bus 13, and the brake control service. When the subject vehicle needs to obtain the location information from an image captured by a camera, the subject vehicle adds the camera ECU 7, the camera ECU adapter 11, the camera ECU service bus 13, and the image capturing service.

The following will describe an example of the integrated application 18 employing the image capturing service of the camera ECU 7. When the subject vehicle travels in the parking lot of company, (i) a vehicle mounted camera functions as a parking lot vacancy detection camera, (ii) the vehicle mounted camera detects the parking lot vacancy with cooperation with a parking lot monitoring camera, and (iii) the integrated application 18 notifies the parking lot vacancy.

When the subject vehicle travels on the traveling road, (i) the vehicle mounted camera functions as a front monitoring camera, (ii) the vehicle mounted camera detects the obstacle such as a preceding vehicle, the bicycle, or the pedestrian, and (iii) the integrated application 18 controls the brake.

When the subject vehicle travels on the intersection, (i) the vehicle mounted camera functions as a pedestrian detection camera, (ii) the vehicle mounted camera detects the pedestrian existing in the dead area with cooperation with a monitoring camera disposed at the intersection, and (iii) the integrated application 18 notifies the existence of pedestrian or controls the brake.

When the subject vehicle arrives at residence, (i) the vehicle mounted camera functions as a security camera, (ii) the vehicle mounted camera detects a suspicious person with cooperation with a security camera disposed at residence, and (iii) the integrated application 18 makes a sound by a horn or illuminates a vehicle light for intimidation.

When employing external infrastructure information, such as traffic signal information of a traffic signal device disposed on the intersection, the local service bus 15 and an infrastructure information provision service are added to the external infrastructure. Suppose that the traffic signal has the local service bus 15 and a signal information provision service. In this case, the integrated application 18 notifies, in cooperation with the traffic signal device, the remaining duration until switch of the signal, or notifies the signal switch to the vehicle which is in the stopped state. The service bus 13 executes a dynamic rooting for each service of the external apparatus, and connects the services with each other so that an existing marketed vehicle can add the new application provided by the external apparatus.

The configuration described in the present embodiment can provide following advantages. The virtual service bus 13 is established, which relays the transmission and reception of the message between the in-vehicle apparatus and the external apparatus. The edge server 9 is described as an example of the external apparatus. The integrated application 18 employs the in-vehicle service and the external service provided by the edge server 9 by cooperating the services with each other. With this configuration, the function of the subject vehicle can keep pace with the rapid development of the external service provided by the edge server 9.

The service manager 13a manages the installation position of the service so that the service is dynamically mutually available to the integrated application 18. With this configuration, the functions of the in-vehicle apparatus and the external apparatus are dynamically mutually available to each other. The service manager 13a manages the service removal and addition so that the service can be dynamically removed and added. With this configuration, the in-vehicle apparatus and the external apparatus can be dynamically removed and added.

The service manager 13a is installed to the service bus 13 of the basic GW 2 relaying the transmitting and receiving of the data between two of the extended GW 1 and the ECUs 4, 5, 6, 7. With this configuration, the service manager 13a dynamically manages both of in-vehicle service and external service. Thus, the application developer can develop the application without considering the position of the employed application and the application removal and addition.

The basic GW 2 and the extended GW 1 have the vehicle information provision proxy service 28. With this configuration, another service of the in-vehicle apparatus can use the service of the in-vehicle apparatus which does not have the local service bus 15, and the in-vehicle apparatus can be encapsulated for the external apparatus.

In the above-described configuration, the virtual vehicle controlled by the integrated application 18 is provided. In this configuration, the integrated application 18 mounted on the edge server 9 controls the subject vehicle through the service bus 13 as the virtual vehicle. The edge server 9 has the virtual vehicle proxy server 30. This configuration can prevent degradation of information security.

The in-vehicle apparatus executes short range communication with the edge server 9. Thus, the external service can be provided by the edge server 9 at a higher speed compared with the case in which the external service is provided by the cloud server 31 directly.

A provision area of the external service can be specified because the short range communication area of the edge server 9 is a predetermined area corresponding to the traveling zone of the subject vehicle. The external services of one edge server 9 are different from the external services of another edge server 9. The services of each edge server 9 are provided corresponding to the short range communication area. So, the subject vehicle cooperates with the external services which are different corresponding to the edge areas, and the external service can complement the autonomous control in every edge area during a travel from a departure place, such as the residence to the destination.

The edge server 9 provides, as the external service, the information of the dead area which is an area beyond the subject vehicle's sensible area. The configuration can enhance the safety during the self-driving. The edge server 9 is established as the edge component of the cloud server. Thus, the information collected from the in-vehicle apparatus can be centrally managed by the cloud server 31, and the information can be provided to the in-vehicle apparatus as the cloud information.

Other Embodiments

In the above-described embodiment, the service bus 13 is established by the edge server 9 and the wireless communication. The service bus 13 may be established through public wireless communication network. In this case, the integrated application 18 may be generated by installing the different service by each region and country based on the position information provided by the position information provision service. The self-driving, the telematics service, the high level drive support, and the big data service each of which is adequate for each region and country may be provided based on the position information provided by the position information provision service.

In the above-described embodiment, the service cooperation system for the vehicle is applied to the self-driving system. The alert for the person or vehicle existing in the dead area may be executed during the manual driving operation of the vehicle. By connecting the service bus 13 of another vehicle, during the travel of the subject vehicle, the approach of another vehicle is notified to the occupant of the subject vehicle, and the collision with another vehicle can be avoided in advance.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A service cooperation system for a vehicle, wherein the service cooperation system enables a use of a function provided by an in-vehicle apparatus or an external apparatus as a service, the in-vehicle apparatus is connected to an in-vehicle network of the vehicle, and the external apparatus is communicably connected to the service cooperation system in wireless manner, the service cooperation system for the vehicle comprising:
a subject processor; and
a different processor;
wherein:
the subject processor is included in one of the in-vehicle apparatus or the external apparatus;
the different processor is included in a remaining one of the in-vehicle apparatus or the external apparatus;
each of the subject processor and the different processor includes a service interface;
the service interface of the subject processor transmits a request for the service to the different processor in response to a request transmitted from an application of the different processor;
the service interface of the subject processor generates the service in the subject processor in response to a request, which requests for the service of the subject processor and is transmitted from the different processor;
the service interface of the subject processor provides the service generated in the subject processor to the different processor;

each of the subject processor and the different processor includes a local service bus;
the local service bus transmits and receives a message between the service interface of the subject processor and the service interface of the different processor under a predetermined protocol in response to a request or a response of the service;
the subject processor and the different processor virtually configure a service bus by a connection of the local service bus of the subject processor and the local service bus of the different processor;
the subject processor and the different processor provide an integrated application functioning as the application and enabling a cooperated use of an in-vehicle service and an external service through the service bus;
the in-vehicle service is provided by the in-vehicle apparatus, and the external service is provided by the external apparatus; and
the subject processor uses the service provided by the different processor through the integrated application.

2. The service cooperation system for the vehicle according to claim 1, further comprising
a service manager enabling the service to be dynamically and mutually employed in the in-vehicle apparatus or in the external apparatus by managing an installation position of the service.

3. The service cooperation system for the vehicle according to claim 2, wherein
the service manager enables the service to be dynamically removed and added by managing a removal and addition of the service.

4. The service cooperation system for the vehicle according to claim 1, further comprising
a vehicle information provision proxy service provided to the subject processor, wherein the vehicle information provision proxy service establishes the service bus by relaying a transmission and reception of the message between the different processor, which does not have the local service bus and the subject processor.

5. The service cooperation system for the vehicle according to claim 1, wherein
the external apparatus is installed with the integrated application, and
the external apparatus includes a virtual vehicle proxy server that establishes the service bus by relaying a transmission and reception of the message between the local service bus of the in-vehicle apparatus and the external apparatus.

6. The service cooperation system for the vehicle according to claim 1, wherein
the in-vehicle apparatus executes a short range communication with the external apparatus.

7. The service cooperation system for the vehicle according to claim 6, wherein
the external apparatus defines a predetermined communication area as a short range communication area corresponding to a traveling zone of the vehicle.

8. The service cooperation system for the vehicle according to claim 7, wherein
the external apparatus provides the service specific to the short range communication area.

9. The service cooperation system for the vehicle according to claim 8, wherein
the external apparatus provides a self-driving support as the service specific to the short range communication area.

10. The service cooperation system for the vehicle according to claim 7, wherein
the external service is installed when the vehicle enters the short range communication area.

11. The service cooperation system for the vehicle according to claim 1, wherein
the external apparatus is provided by an edge server functioning as an edge component of a cloud server.

* * * * *